US012797815B2

(12) United States Patent
Koseoglu

(10) Patent No.: US 12,797,815 B2
(45) Date of Patent: Nov. 17, 2026

(54) METHOD AND SYSTEM FOR LOADING A CATALYST

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 723 days.

(21) Appl. No.: 18/333,636

(22) Filed: Jun. 13, 2023

(65) Prior Publication Data

US 2024/0416307 A1 Dec. 19, 2024

(51) Int. Cl.
*B01J 8/00* (2006.01)
*B01J 8/08* (2006.01)
*B01J 8/16* (2006.01)

(52) U.S. Cl.
CPC ............... *B01J 8/003* (2013.01); *B01J 8/087* (2013.01); *B01J 8/16* (2013.01)

(58) Field of Classification Search
CPC ................ B01J 2208/00752; B01J 8/06; B01J 2208/00769
See application file for complete search history.

(56) References Cited

U.S. PATENT DOCUMENTS 3,749,258 A * 7/1973 James ...................... B01J 8/003 53/260
3,898,180 A 8/1975 Crooks et al.
6,572,787 B1 * 6/2003 Huisman .................. B01J 23/46 252/373
7,285,251 B2 * 10/2007 Johns ...................... G01F 23/04 422/219
7,712,490 B2 * 5/2010 Brennom ................. B01J 8/003 239/681
2008/0142045 A1 * 6/2008 Johns ..................... B01J 8/0025 134/21
2015/0107717 A1 * 4/2015 Knubben .................. B01J 8/06 141/69
2016/0263542 A1 * 9/2016 Brightling ................ G01K 7/02

FOREIGN PATENT DOCUMENTS

WO 2021140227 A1 7/2021

OTHER PUBLICATIONS

Huber et al., "Accelerated catalyst evaluation", Hydrocarbon Engineering, 2014.

* cited by examiner

*Primary Examiner* — Timothy P. Kelly
(74) *Attorney, Agent, or Firm* — DINSMORE & SHOHL LLP

(57) ABSTRACT

A method of loading a catalyst includes providing a catalyst loading apparatus having an optically transparent tube removably coupled to a metal tube and a horizontal divider having a shaft coupled to a plate, the horizontal divider positioned within the optically transparent tube, the metal tube or at least partially within both. The method also includes adding a first inert material to the optically transparent tube, adding a catalyst into the optically transparent tube, adding a second inert material to the optically transparent tube, inserting a distal end of a leveling device having a shaft and a disc into the catalyst loading apparatus from the top surface of the optically transparent tube, contacting the disc of the leveling device against the second layer comprising the catalyst; and displacing at least the horizontal divider into the metal tube.

12 Claims, 11 Drawing Sheets

METHOD AND SYSTEM FOR LOADING A CATALYST

TECHNICAL FIELD

Embodiments of the present disclosure generally relate to methods and systems for loading catalysts, and particularly to loading catalysts for testing in pilot reactors.

BACKGROUND

Catalysts play an important role in many refinery and reactor processes, with new catalyst compositions being consistently developed. Accordingly, pilot plant evaluation of these catalysts is an important step before broader implementation and scale-up for use in commercial reactors.

SUMMARY

For example, in typical hydroprocessing trickle-bed reactors may be used, in which a liquid phase and a gas phase flow concurrently downward through a fixed bed of catalyst particles while the reaction with the catalyst takes place. Accordingly, pilot plant processes may mimic these trickle-bed reactors by vertically loading 'packing' a catalyst in a metal tube, then loading that metal tube into a system that flows a testing feed across the metal tube to test the catalyst's performance. Metal tubes are used due to the severe conditions (temperature and/or pressure) of most pilot plant processes. However, typical catalyst loading procedures may introduce multiple sources of error through void spaces within the catalyst pack, which in turn may cause channeling of the feedstock throughout these void spaces.

One traditional solution to the void space problem is to additionally add inert material of a relatively smaller size than the loaded catalyst, which ideally will 'gap fill' the void spaces between catalyst particles. However, visual confirmation of this gap fill is ordinarily impossible because the metal tubes used are not transparent. Glass and similar materials are transparent, but do not normally contain the properties necessary for use in reactor conditions. Accordingly, methods and apparatuses are desired for loading catalysts for use in pilot reactors while also being able to visually observe the catalyst loading.

Consequently, described herein are integrated methods and systems for loading catalysts, while providing the aforementioned benefits. Particularly, visual observation and confirmation of proper catalyst loading may be affected by loading the catalyst in an optically transparent tube coated by wax. The optically transparent tube is coupled to a metal tube, with an internal cavity defined by the two tubes separated by a horizontal divider. The loaded catalyst may then be transferred to the metal tube from the optically transparent tube by removal of the horizontal divider and displacement of the loaded catalyst. The layer of wax may help move the loaded catalyst as one mass, thereby limiting the shifting of catalyst and inert materials within. Methods of displacement may include melting the wax layer surrounding the loaded catalyst, thereby causing the loaded catalyst to slide down into the metal tube, but may also include compressive force to move the loaded catalyst to the metal tube or differential pressure from the optically transparent tube to the metal tube.

In accordance with an embodiment herein, a method of loading a catalyst includes providing a catalyst loading apparatus, the catalyst loading apparatus including: an optically transparent tube having an interior surface and an exterior surface, a metal tube having an interior surface and an exterior surface, removably coupled to, and disposed below the optically transparent tube, wherein the optically transparent tube and the metal tube together define a cavity extending from a top surface of the optically transparent tube to a bottom surface of the metal tube, a horizontal divider including a horizontal divider shaft and a plate coupled to a distal end of the horizontal divider shaft, wherein the horizontal divider is positioned within the interior surface of the optically transparent tube, the metal tube, or at least partially within both, and the plate is configured to block the cavity, and a leveling device including a leveling device shaft and a disc coupled to a distal end of the leveling device shaft, the disc sized to be inserted into the cavity. The method also includes adding a first inert material to the optically transparent tube to form a first layer including the first inert material; adding a catalyst to the optically transparent tube to form a second layer including the catalyst disposed above the first layer; adding a second inert material to the optically transparent tube at least until substantially no void space is observed in the second layer, the second inert material having a lesser diameter than the first inert material and the catalyst; inserting the disc of the leveling device into the cavity from the top surface of the optically transparent tube; contacting the disc of the leveling device against the second layer including the catalyst; and displacing the leveling device, the first layer, the second layer, and the horizontal divider into the metal tube.

In accordance with another embodiment herein, a method for loading a catalyst includes providing a catalyst loading apparatus, the catalyst loading apparatus including an optically transparent tube having an interior surface and an exterior surface, a metal tube having an interior surface and an exterior surface, removably coupled to, and disposed below the optically transparent tube, wherein the optically transparent tube and the metal tube together define a cavity extending from a top surface of the optically transparent tube to a bottom surface of the metal tube, a horizontal divider including a horizontal divider shaft and a plate coupled to a distal end of the horizontal divider shaft, wherein the horizontal divider is positioned within the interior surface of the optically transparent tube, the metal tube, or at least partially within both, and the plate is configured to block the cavity, and a leveling device including a leveling device shaft and a disc coupled to a distal end of the leveling device shaft, the disc sized to be inserted into the cavity. The method also includes coating the interior surface of the optically transparent tube, the interior surface of the metal tube, a horizontal divider plate top surface, or combinations thereof with a first wax; adding a first inert material to the optically transparent tube to form a first layer including the first inert material; adding a catalyst to the optically transparent tube to form a second layer including the catalyst disposed above the first layer; adding a second inert material to the optically transparent tube at least until substantially no void space is observed in the second layer, the second inert material having a lesser diameter than the first inert material and the catalyst; adding additional first inert material to the optically transparent tube prior to inserting the leveling device to form a third layer including the first inert material disposed above the second layer; and adding a second wax to the optically transparent tube at least until the second wax is observed to coat the horizontal divider plate top surface inserting the disc of the leveling device into the cavity from the top surface of the optically transparent tube; contacting the disc of the leveling device against the third layer; displacing the leveling device, the first layer, the second layer, the third layer, and the horizontal divider into the metal tube; removing the leveling device from the optically transparent tube; decoupling the optically transparent tube from the metal tube; coupling a cover to a top surface of the metal tube, the cover including a screen; inverting the catalyst loading apparatus; and removing the horizontal divider from the metal tube.

In accordance with yet another embodiment herein, a system for loading a catalyst includes one or more catalyst loading assemblies, the one or more catalyst loading assemblies including an optically transparent tube having an interior surface and an exterior surface, a metal tube having an interior surface and an exterior surface, removably coupled to, and disposed below the optically transparent tube, wherein the optically transparent tube and the metal tube together define a cavity extending from a top surface of the optically transparent tube to a bottom surface of the metal tube, and a horizontal divider including a shaft and a plate coupled to a distal end of the shaft, wherein the horizontal divider is positioned within the interior surface of the optically transparent tube, the metal tube, or at least partially within both, has the shaft proximal the bottom surface of the metal tube, has the plate proximal the top surface of the optically transparent tube, and is configured to block the cavity. The system also includes at least one coupling mechanism removably coupled to the exterior surface of the optically transparent tube, the metal tube, or both; and at least one arm coupled to the at least one coupling mechanism and operable to suspend the at least one catalyst loading apparatus in a vertical position with the at least one coupling mechanism.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure generally relate to methods and systems for loading catalysts, and particularly to loading catalysts for testing in pilot reactors.

As used herein, a "catalyst" refers to any substance that increases the rate of a specific chemical reaction. Catalysts described in this disclosure may be utilized to promote various reactions, such as, but not limited to, hydrotreating, hydrocracking, hydroprocessing, hydrodemetalization, hydrodesulfurization, hydrodenitrogenation, aromatic methylation, disproportionation, dealkylation, transalkylation, diaromatic dearylation, and isomerization.

As used herein, "optically transparent" means an average transmittance of 70% or more in the wavelength range of 400 nm to 700 nm through a 1.0 mm thick piece of a material. In embodiments, an optically transparent material may have an average transmittance of 75% or more, 80% or more, 85% or more, or 90% or more in the wavelength range of 400 nm to 700 nm through a 1.0 mm thick piece of the material. The average transmittance in the wavelength range of 400 nm to 700 nm is calculated by measuring the transmittance of all whole number wavelengths from 400 nm to 700 nm and averaging the measurements.

Figure 1:
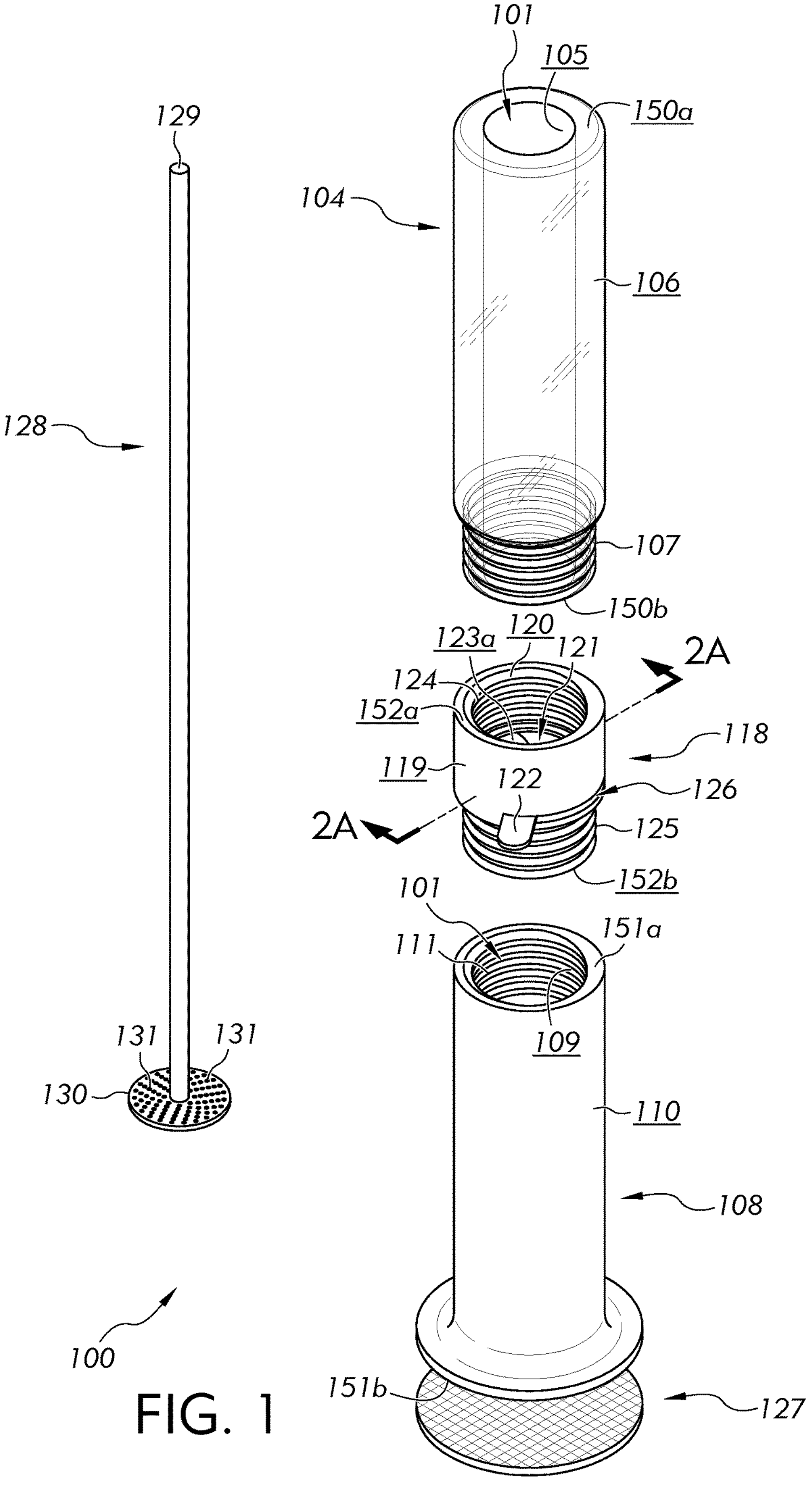
FIG. 1 depicts an exploded view of an apparatus for loading a catalyst, in accordance with one or more embodiments described herein.

Referring initially to FIG. 1, an exploded view of a catalyst loading apparatus 100 according to one or more embodiments herein is illustrated. As shown in FIG. 1, the catalyst loading apparatus 100 may include an optically transparent tube 104, a metal tube 108, and a first horizontal divider 118. The optically transparent tube 104 may have an interior surface 105, an exterior surface 106, a top surface 150*a*, and a bottom surface 150*b*. Similarly, the metal tube 108 may have an interior surface 109, an exterior surface 110, a top surface 151*a*, and a bottom surface 151*b*. Also similarly, the first horizontal divider 118 may have an exterior surface 119, an interior surface 120, a top surface 152*a*, and a bottom surface 152*b*.

As previously stated, the catalyst loading apparatus 100 may include the first horizontal divider 118. The first horizontal divider 118 may be removably coupled to and disposed below the optically transparent tube 104. The first horizontal divider 118 may also be removably coupled to and disposed above the metal tube 108. Accordingly, when removably coupled together, the optically transparent tube 104, the metal tube 108, and the first horizontal divider 118 may together define a cavity 101 extending from the top surface 150*a* of the optically transparent tube 104 to the bottom surface 151*b* of the metal tube 108. The cavity 101 may in turn be configured to provide an unobstructed fluid pathway through the catalyst loading apparatus 100.

Figure 2A:
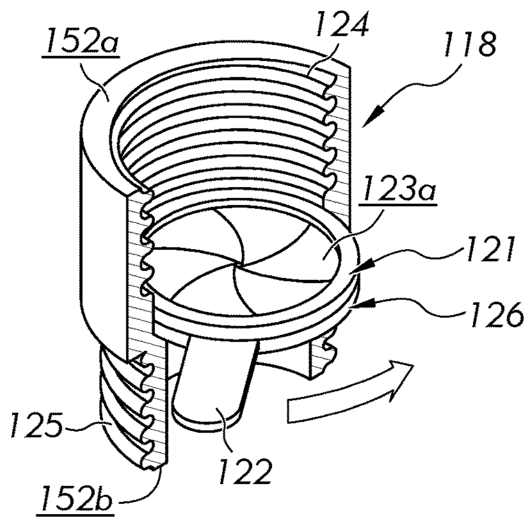
FIG. 2A depicts a partial cross-section of the horizontal divider of FIG. 1 in the closed position, for use with one or more of the apparatuses for loading a catalyst, in accordance with one or more embodiments described herein.
Figure 2B:
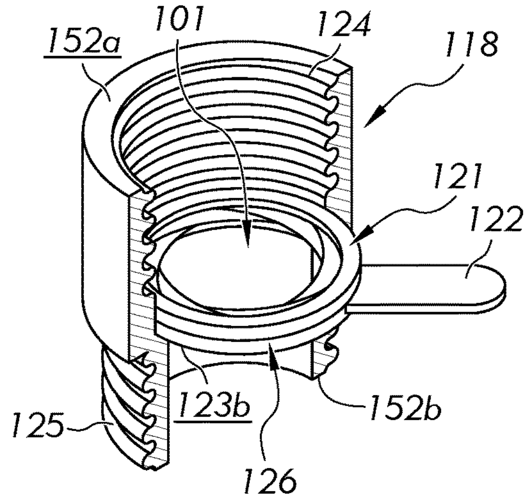
FIG. 2B depicts a partial cross-section of the horizontal divider of FIG. 1 in the opened position, for use with one or more of the apparatuses for loading a catalyst, in accordance with one or more embodiments described herein.
Figure 3A:
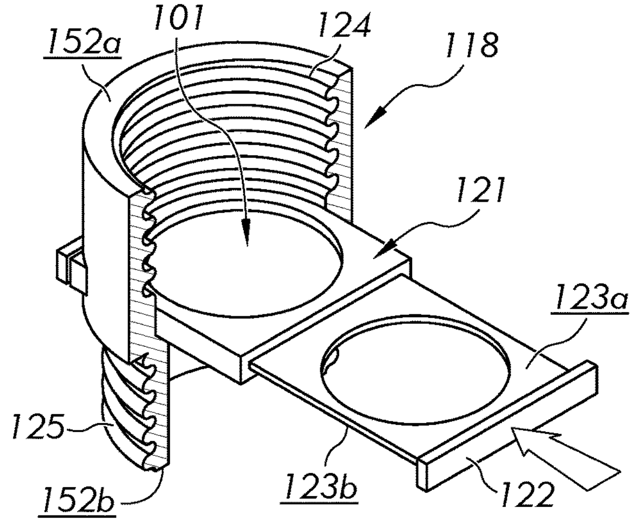
FIG. 3A depicts a partial cross-section of a horizontal divider in the opened position, for use with one or more of the apparatuses for loading a catalyst, in accordance with one or more embodiments described herein.
Figure 3B:
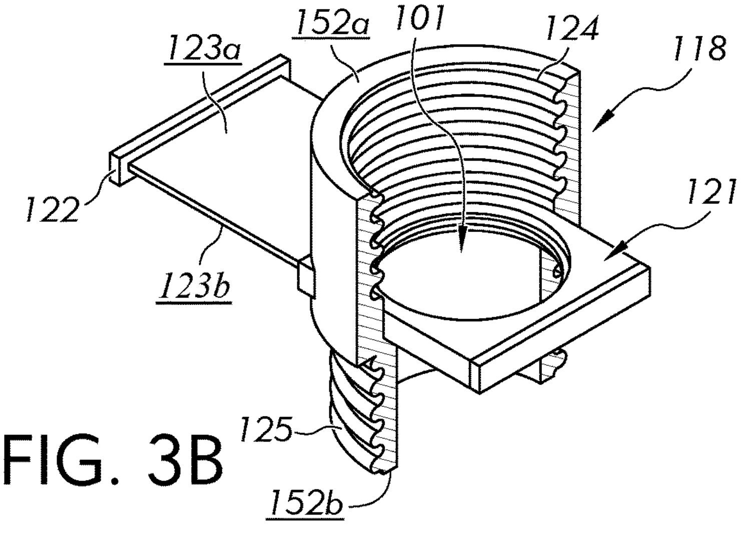
FIG. 3B depicts a partial cross-section of the horizontal divider of FIG. 3A from the reverse view, for use with one or more of the apparatuses for loading a catalyst, in accordance with one or more embodiments described herein.

Now referring to FIGS. 2A-3B, illustrated are partial cross sections of first horizontal dividers 118 that may be utilized in the catalyst loading apparatuses 100 herein. Particularly, as depicted in FIGS. 2A-3B, the first horizontal dividers 118 may also include a gate 121 disposed within the interior surface 120. The gate, when closed, may have a top surface 123*a* as well as a bottom surface 123*b*. Moreover, the gate 121, when in a closed position, as best illustrated in FIG. 2A, may be operable to create an obstruction to fluid flow within the catalyst loading apparatus 100, and thereby block the cavity 101. Similarly, the gate 121, when in an opened position as best illustrated in FIGS. 2B-3B, may operate to create an unobstructed fluid pathway within the catalyst loading apparatus 100 along the cavity 101. To actuate to the opened and closed positions, the first horizontal divider 118 may further include a handle 122 and an associated slot 126, through which the handle 122 may travel. The handle 122 may also be mechanically connected to the gate, such that the translation of the handle 122 through the slot 126 opens or closes the gate 121.

Referring to FIGS. 1-3B, the first horizontal divider 118, as well as the gate 121, may be present in a variety of forms, each of which may be operable in the closed position to block the cavity 101, as well as create an unobstructed fluid pathway through the cavity 101 when in the opened position. For example, and in embodiments, the gate 121 may be a shutter. The shutter may be selected from the group including diaphragm shutters (FIGS. 2A-2B), guillotine shutters (FIGS. 3A-3B), simple leaf shutters, or combinations thereof.

Figure 4:
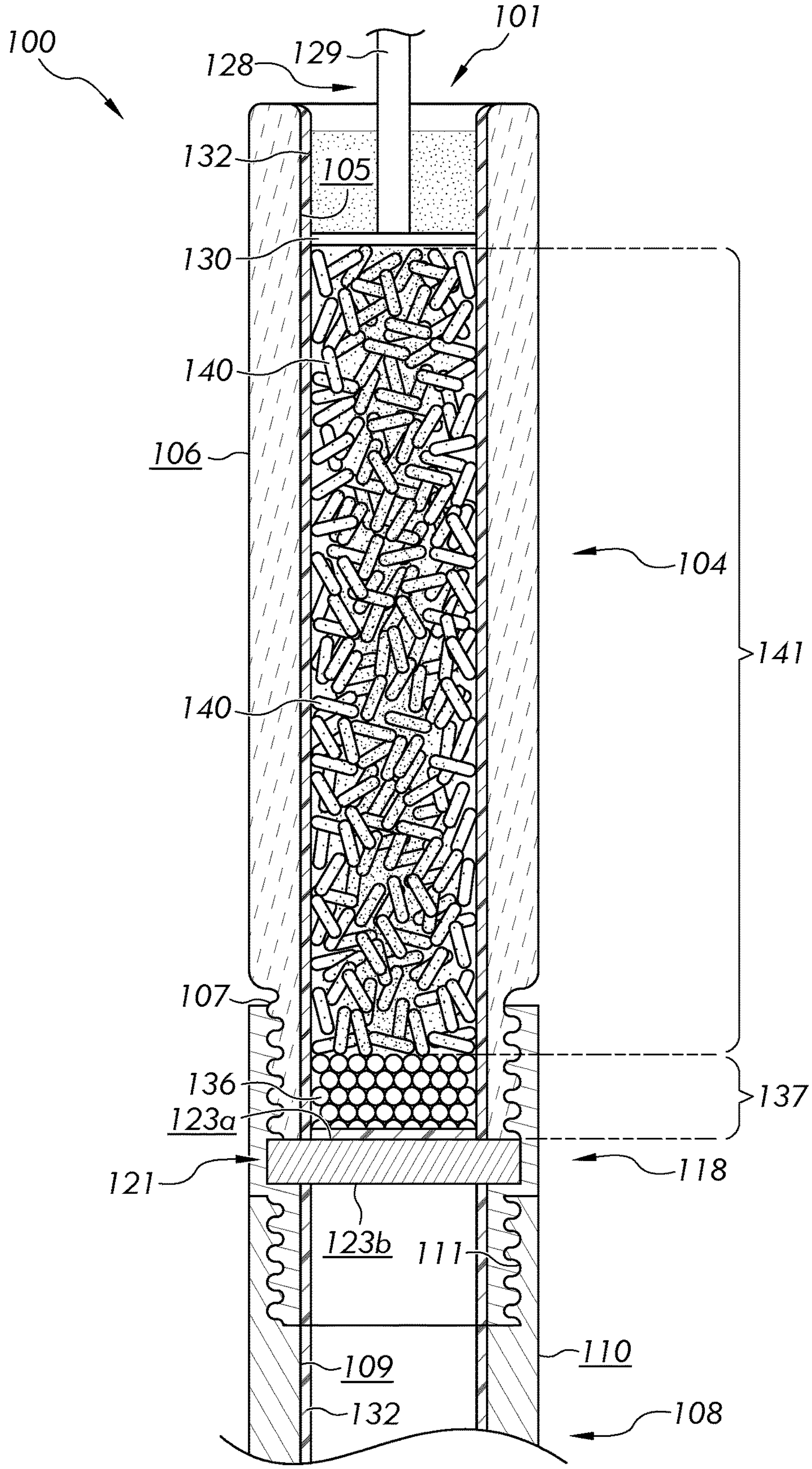
FIG. 4 depicts a cross-sectional view of the apparatus of FIG. 1, and shows the use of the leveling device in accordance with one or more embodiments described herein.
Figure 5:
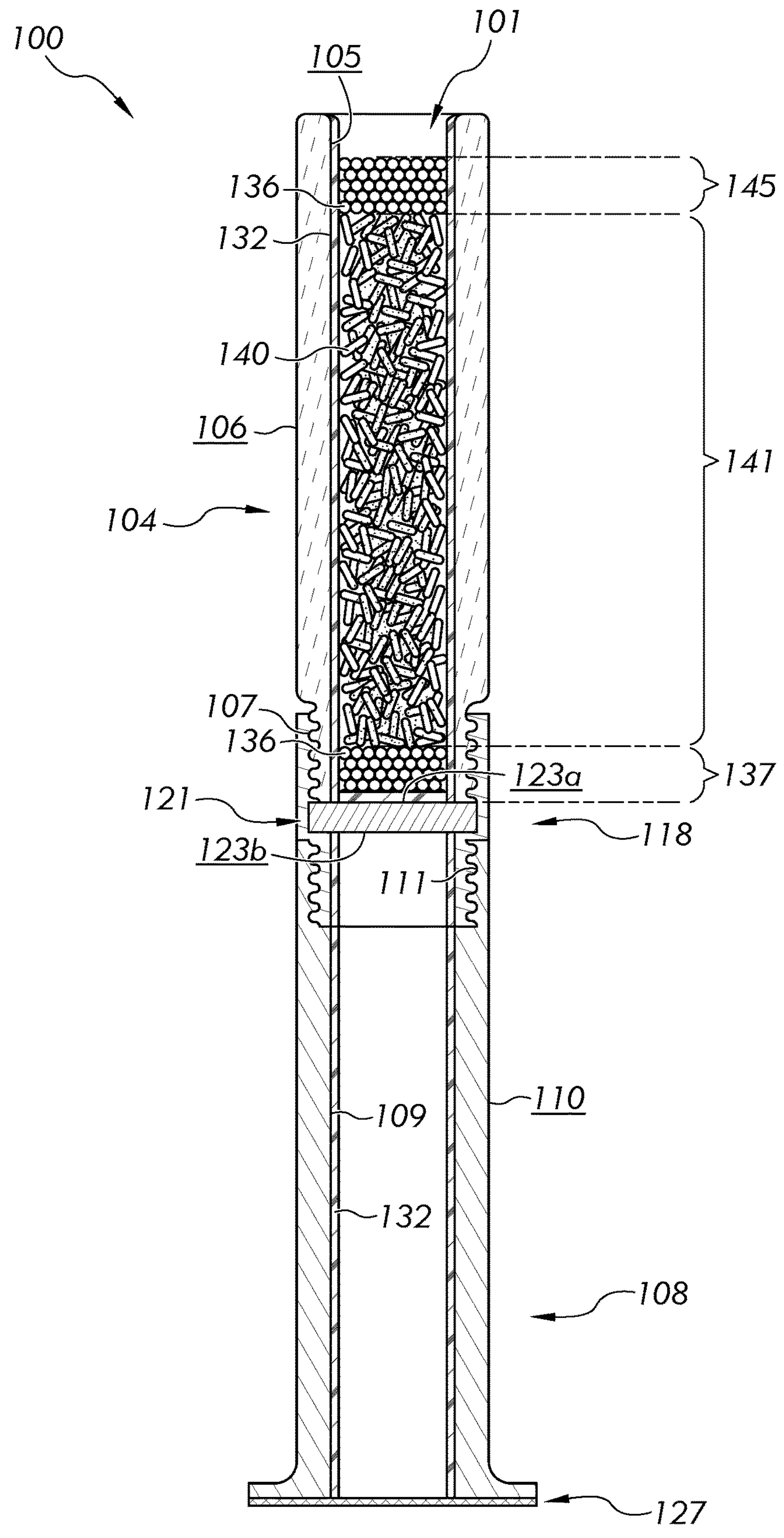
FIG. 5 depicts a cross-sectional view of the apparatus of FIGS. 1-2, and particularly the loaded catalyst prior to removal of the horizontal divider in accordance with one or more embodiments described herein.
Figure 6:
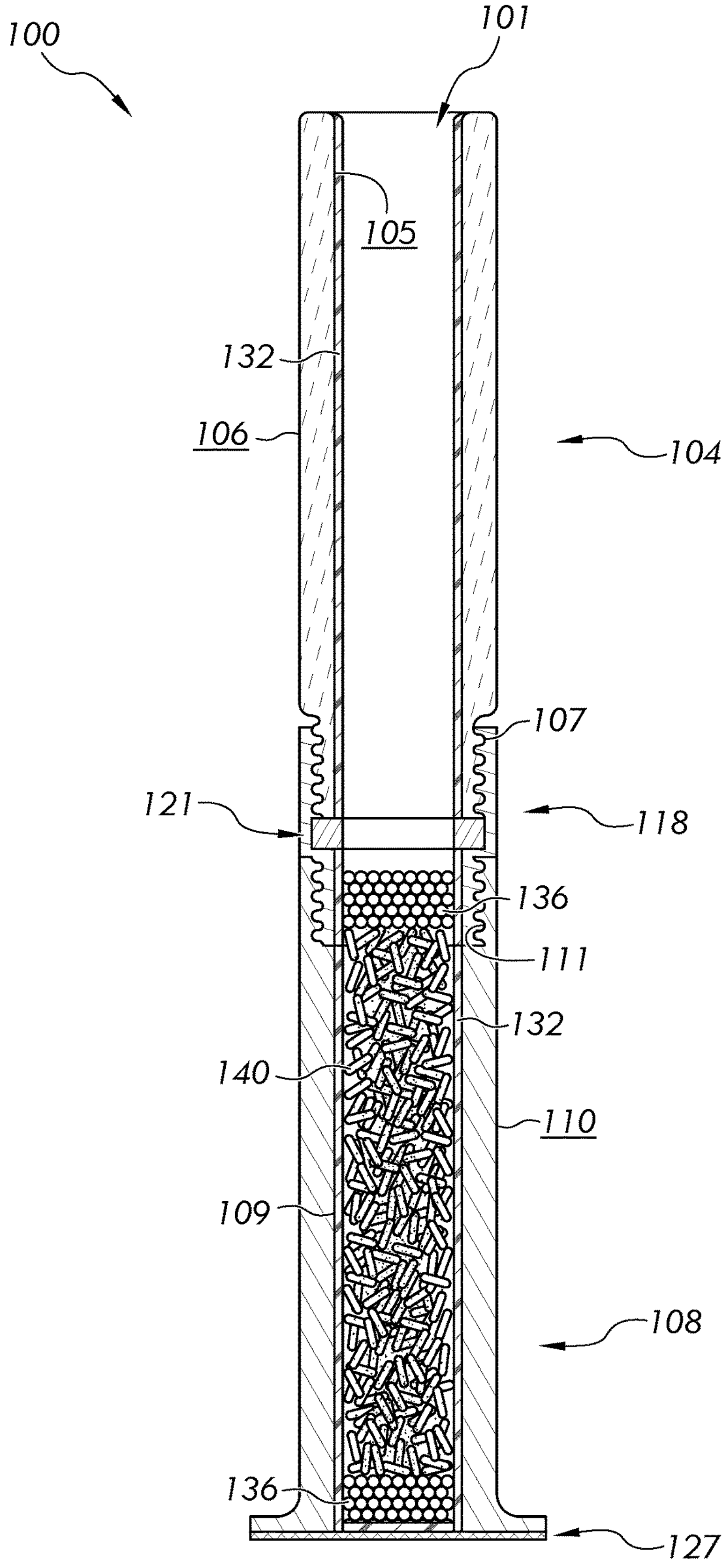
FIG. 6 depicts a cross-sectional view of the apparatus of FIGS. 1-3, and particularly the loaded catalyst after removal of the horizontal divider and displacement into the metal tube, in accordance with one or more embodiments described herein.

Now referring to FIGS. 4-6, illustrated are cross sections of the catalyst loading apparatus of FIG. 1. As shown in FIGS. 4-6, the metal tube 108 may be removably coupled to and disposed below the first horizontal divider 118. The optically transparent tube 104, the first horizontal divider 118, the metal tube 108, or any combination thereof, may be removably coupled according in any manner understood in the art, including but not limited to flange-type connectors, threaded connectors, adhesive connectors, magnetic connectors, or the like. For example, and as illustrated in FIG. 1, the optically transparent tube 104 may include a male threaded connector 107, with the first horizontal divider 118 including a paired female connector 124. Similarly, the optically transparent tube 104 may include the paired female connector, and the first horizontal divider may include the male threaded connector. Moreover, the first horizontal divider 118 may include a male threaded connector 125, with the metal tube 108 including a paired female connector 111.

In embodiments, the catalyst loading apparatus 100 may further include a screen 127 removably coupled to the metal tube 108 at the metal tube 108's bottom surface 151*b* through one of the coupling mechanisms previously stated. The screen may be operable to permit fluid flow out of the catalyst loading apparatus 100, but block solid material such as a catalyst or inert material, as described in further detail infra.

In embodiments, the catalyst loading apparatus 100, including the optically transparent tube 104, the first horizontal divider 118, the metal tube 108 or combinations thereof, may be sized to fit in traditional pilot plant reactors for testing catalyst compositions. For example, in one non-limiting embodiment, an interior diameter of the interior surfaces 105, 109, 120 of the catalyst loading apparatus 100 may be from 1 centimeter (cm) to 15 cm, such as from 0.1 cm to 0.5 cm, from 0.5 cm to 1 cm, from 1 cm to 2 cm, from 2 cm to 4 cm, from 4 cm to 8 cm, from 8 cm to 12 cm, from 12 cm to 14 cm, from 14 cm to 15 cm, from 15 cm to 20 cm, from 20 cm to 50 cm, or any combination of ranges or smaller range therein, such as from 0.1 cm to 50 cm. Similarly, in embodiments, the length of the optically transparent tube 104, the first horizontal divider 118, the metal tube 108, or combinations thereof, may be from 0.1 meters (m) to 10 meters, such as from 0.01 m to 0.05 m, from 0.05 m to 0.1 m, from 0.1 m to 0.2 m, from 0.2 m to 0.5 m, from 0.5 m to 1 m, from 1 m to 4 m, from 4 m to 8 m, from 8 m to 9 m, from 9 m to 10 m, from 10 m to 15 m, from 15 m to 25 m, or any combination of ranges or smaller range therein, such as from 0.01 m to 25 m.

The optically transparent tube 104 may be composed of any one of a number of materials known to be optically transparent. For example, and in embodiments, the optically transparent tube may include plexiglass, glass, or any polymeric material that is optically transparent, such that the internal contents of the optically transparent tube may be visually observed by an individual or optical device. The metal tube 108 may be composed of any one of a number of materials capable of withstanding pilot plant reactor conditions. For example, and in embodiments, the metal tube may include steel or metallic alloys including nickel, molybdenum, chromium, or combinations thereof.

Referring to FIGS. 1 and 4, the catalyst loading apparatus may further include a leveling device 128. The leveling device 128 may include a shaft 129 and a disc 130 coupled to a distal end of the shaft 129. The disc 130 may be sized to fit or otherwise be inserted within the cavity 101 of the catalyst loading apparatus 100. The disc 130 may be porous, i.e. the disc 130 may include a plurality of bores 131 extending through the disc 130. The plurality of bores 131 may be proportionally spaced across the disc 130. The plurality of bores may have an aperture of less than or equal to 0.31 millimeters (mm), such as from 0.001 mm to 0.005 mm, from 0.005 mm to 0.01 mm, from 0.01 mm to 0.05 mm, from 0.05 mm to 0.1 mm, from 0.1 mm to 0.2 mm, from 0.2 mm to 0.25 mm, from 0.25 mm to 0.3 mm, from 0.3 mm to 0.31 mm, or any combination of ranges or smaller range therein, such as from 0.001 mm to 0.31 mm.

Figure 7:
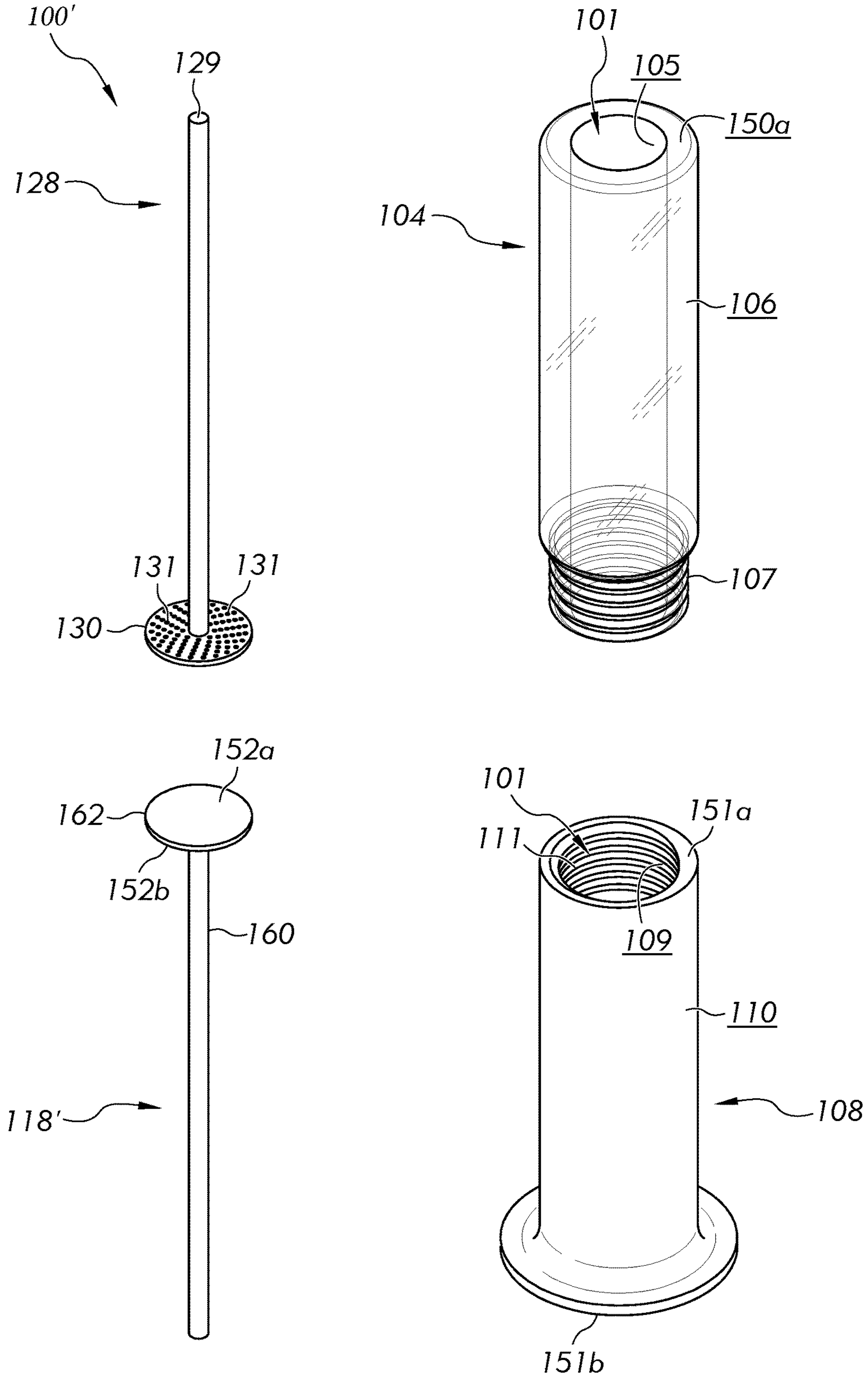
FIG. 7 depicts a exploded view of another apparatus for loading a catalyst, in accordance with one or more embodiments described herein.

Now referring to FIGS. 7-11, another catalyst loading apparatus 100' is illustrated. The catalyst loading apparatus 100' may be similar in some aspects to the catalyst loading apparatus 100. For example, as shown in FIG. 7, the catalyst loading apparatus 100' may include the optically transparent tube 104, the metal tube 108, and the leveling device. However, the catalyst loading apparatus 100' may differ from the catalyst loading apparatus 100 in that it may include a second horizontal divider 118', which may include a horizontal divider shaft 160 and a horizontal divider plate 162 coupled to a distal end of the horizontal divider shaft 160. Accordingly, the second horizontal divider 118' of FIGS. 7-11 may be similar in at least some aspects to the leveling device 128. The second horizontal divider 118', particularly the horizontal divider plate 162, may be sized to fit or otherwise be inserted within the cavity 101 of the catalyst loading apparatus 100', rather than removably coupling to the optically transparent tube 104 and the metal tube 108. Accordingly, the optically transparent tube 104 may be removably coupled to the metal tube 108 through the male threaded connector 107 and the female threaded connector 111, or through any of the other fastening means previously discussed. The second horizontal divider 118' may be positioned within the optically transparent tube's interior surface 105, the metal tube's interior surface 109, or at least partially within both. In so being placed, the second horizontal divider 118' of FIGS. 7-11, through the horizontal divider plate 162 may block fluid flow through the cavity 101.

In at least one embodiment, the second horizontal divider 118' and the leveling device 128 may be configured to be inserted through, respectively, the metal tube bottom surface 151*b* and the optically transparent tube's top surface 150*a*. The second horizontal divider 118 may be orientated such that the plate 162 is proximal the optically transparent tube's top surface 150*a*. In other words, the plate 162 may be nearer to the optically transparent tube's top surface 150*a* than the horizontal divider shaft 160. Likewise, the horizontal divider shaft 160 may be proximal the metal tube's bottom surface 151*b*.

Figure 8:
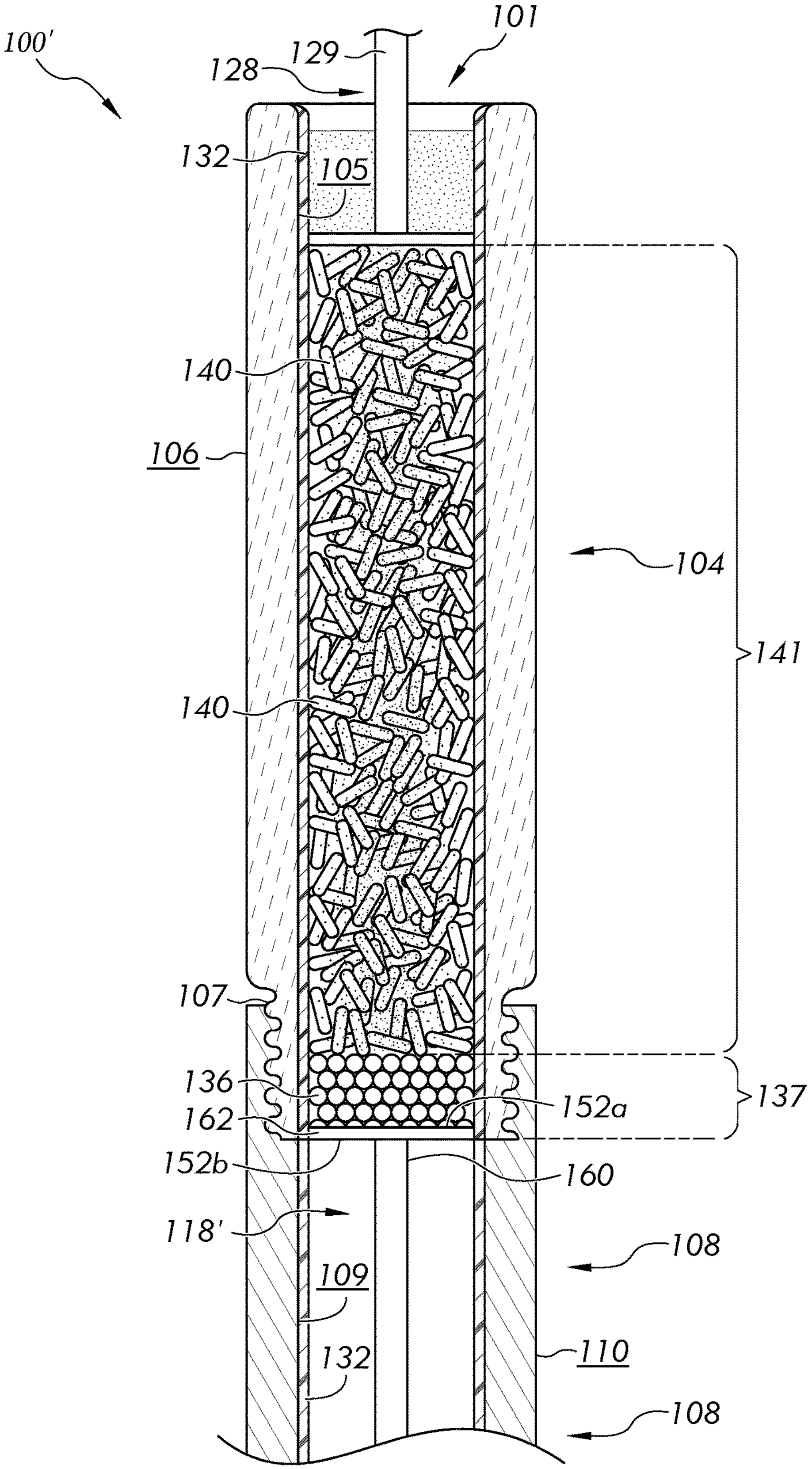
FIG. 8 depicts a cross-sectional view of the apparatus of FIG. 7, and shows the use of the leveling device in accordance with one or more embodiments described herein.
Figure 9:
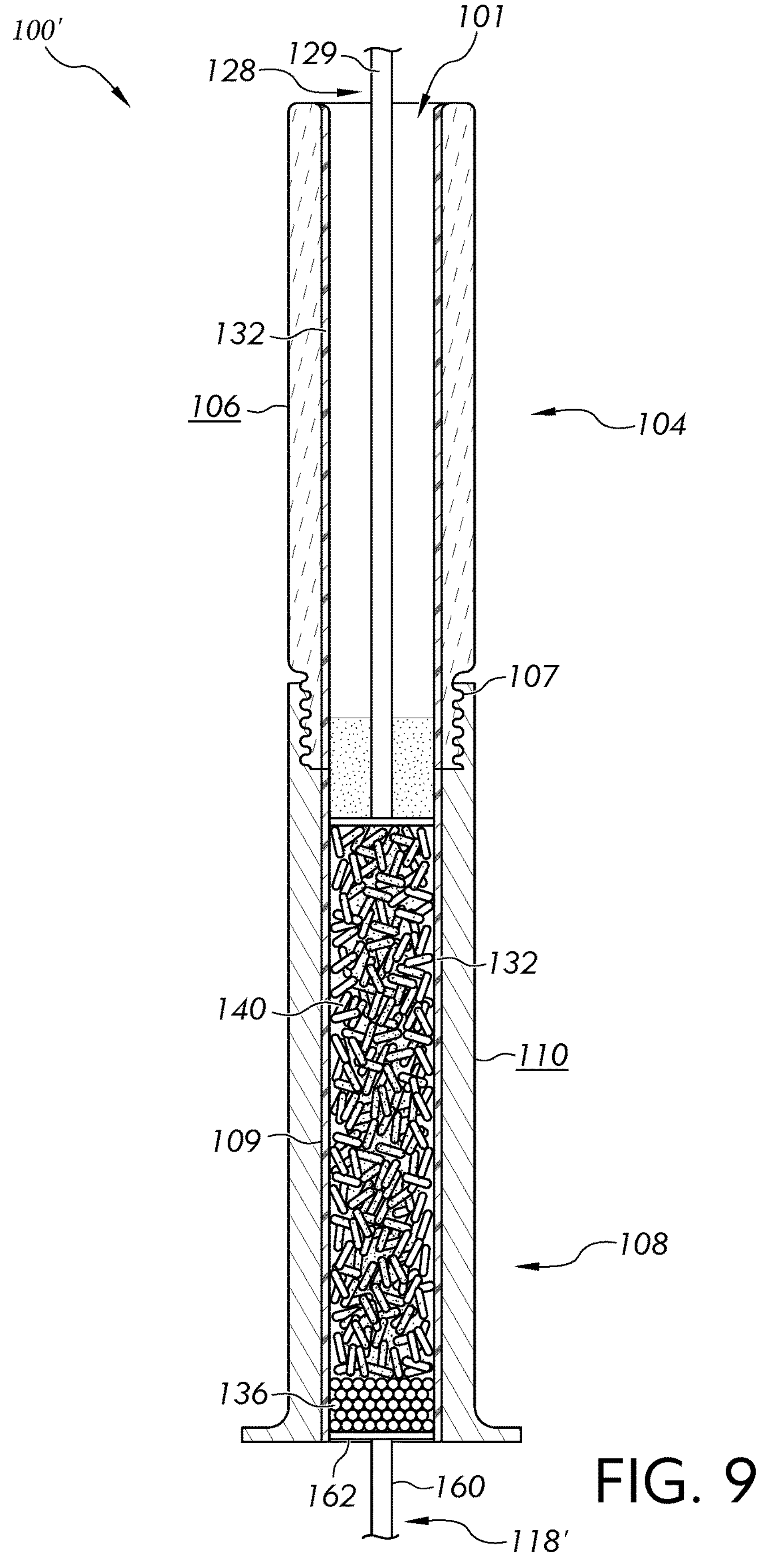
FIG. 9 depicts a cross-sectional view of the apparatus of FIGS. 7-8, and particularly the loaded catalyst after displacement to the metal tube, in accordance with one or more embodiments described herein.

Accordingly, as illustrated in FIGS. 8-9, the combination of the second horizontal divider 118 and the leveling device 128 may operate to sandwich a loaded catalyst between the leveling device disk 130 and the horizontal divider plate 162. As explained in further detail hereinbelow, such an arrangement may permit the displacement of the leveling device 128, loaded catalyst, and second horizontal divider 118 from the optically transparent tube 104 (FIG. 8) to the metal tube 108 (FIG. 9) without disturbing the orientation of the layers of the loaded catalyst.

Figure 12:
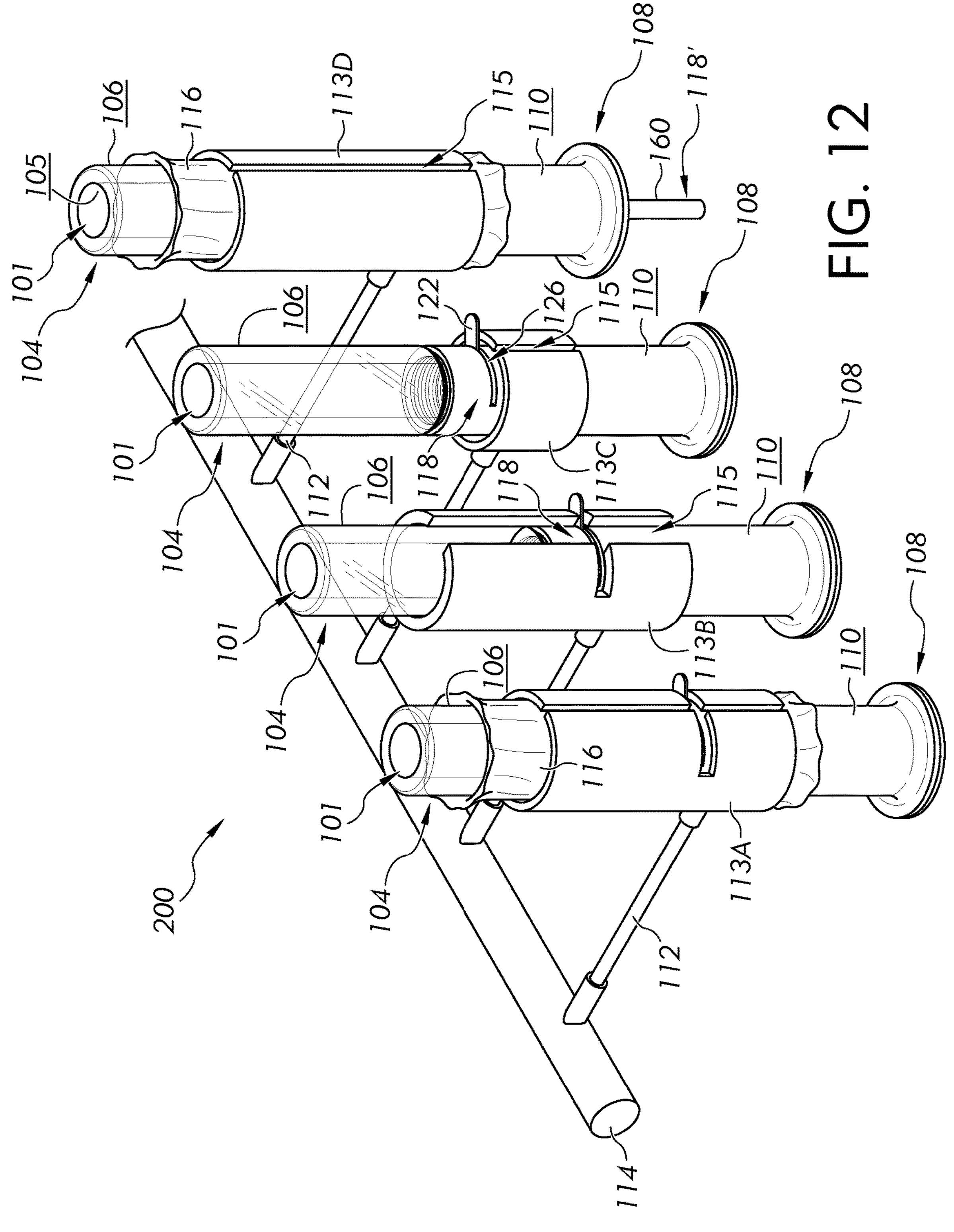
FIG. 12 depicts a system for utilizing one or more of the catalyst loading apparatuses of FIGS. 1-11, in accordance with one or more embodiments described herein.

Now referring to FIG. 12, a system 200 for utilizing the catalyst loading apparatuses 100 and 100' described supra according to one or more embodiments herein is depicted. As shown in FIG. 7, the system 200 may include one or more catalyst loading apparatuses 100, 100', or combinations thereof. The system 200 may further include at least one coupling mechanism 113 removably coupled to an exterior of the optically transparent tube 104, the metal tube 108, or both. The at least one coupling mechanism 113 may in turn be coupled to at least one arm 112. The at least one arm 112 and the at least one coupling mechanism 113 may together be operable to suspend the at least one catalyst loading apparatus in a vertical position. The system 200 may also include a cross-arm 114, coupled to the at least one arm 112. In this manner, the system 200 may suspend multiple catalyst loading apparatuses 100 in-line in the same relative vertical position.

Still referring to FIG. 12, the system 200 may further include at least one heating element 116. The at least one heating element 116 may be in contact with the exterior surface 106 of the optically transparent tube 104, the exterior surface 119 of the first horizontal divider 118, the exterior surface 110 of the metal tube 108, or combinations thereof. The at least one heating element 116 may also be operable to heat the optically transparent tube 104, the first horizontal divider 118, the metal tube 108, or combinations thereof to displace the loaded catalyst into the metal tube 108, as described in further detail infra. As shown in FIG. 12, the at least one heating element 116 may be a separate element from the at least one coupling mechanism 113, i.e. the at least one heating element 116 may be positioned between the at least one coupling mechanism 113 and the one or more catalyst loading apparatuses 100 as shown with coupling mechanisms 113A and 113D. However, in some embodiments, the at least one coupling mechanism may also be, i.e., may function as, the heating element, such as the coupling mechanisms 113B and 113C illustrated in FIG. 12.

The at least one heating element 116 may heat the optically transparent tube 104, the first horizontal divider 118, the metal tube 108, or combinations thereof through any manner understood in the art, such as, but not limited to, electrically inductive heating. Accordingly, without being limited by theory, the heating element may be electrically coupled to a power source operable to provide an electric current through the heating element, and thereby generate heat form the heating element.

Still referring to FIG. 12, the at least one coupling mechanism 113 may be variably sized. Particularly, as illustrated with coupling mechanisms 113C, the at least one coupling mechanism may be configured to be coupled to only the metal tube 108. Without being limited by theory, this may allow unobstructed observation of the optically transparent tube 104 during the catalyst loading methods described in more detail infra. However, the at least one coupling mechanism 113, the at least one heating element 116, or both may also be optically transparent to allow unobstructed observation of the interior of the optically transparent tube 104.

Alternatively or additionally, the at least one coupling mechanism 113 may include an open end, i.e. the at least one coupling mechanism 113 may not entirely circumferentially surround the catalyst loading apparatus 100. Accordingly, the at least one coupling mechanism may define a window 115, thereby allowing unobstructed observation of the window defined portion of the catalyst loading apparatus 100. As shown in coupling mechanism 113B as compared to coupling mechanism 113C, the window 115 may be larger (wider) in some embodiments than in others.

Still referring to FIG. 12, the system 200 may also include a settling device. The settling device, similar to the at least one coupling mechanism 113, may be in contact with the exterior surface 106 of the optically transparent tube 104, the exterior surface 110 of the metal tube 108, or both. The settling device may be operable to vibrate the catalyst loading apparatus 100, 100', or both. As described in further detail infra, this may be operable to settle smaller inert material within void space while loading the catalyst. Additionally or alternatively, in some embodiments, the settling device may be removably coupled to the cross-arm 114, which may in turn vibrate the system 200 as a whole.

Now referring to FIGS. 4-12, and as previously stated, embodiments herein may also include methods of loading a catalyst. The methods infra may include any of the catalyst loading apparatuses 100, 100', or systems 200 described supra.

The process may first include providing the catalyst loading apparatus. The process may then include coating the interior surface 105, the interior surface 109, or both, with a first wax. As shown in FIGS. 4-6 and 8-11, this may operate to form a wax layer 132 on the interior surface 105, the interior surface 109, or both. However, the method may also include coating the top surface 123*a* of the gate 121 or the top surface 152*a* of the horizontal divider plate 162, in a similar manner. In embodiments, the wax layer 132 may be coated on the interior surfaces 105/109, as well as the top surface 123*a* of the gate 121 or the top surface 152*a* of the horizontal divider plate 162, by spraying a heated solution of the first wax, spraying a solution of the wax in paraffin solvent, or combinations thereof, on the interior surfaces 105/109/123*a*. The sprayed solution of the wax may then be allowed to cool and/or harden on any of the surfaces 105/109/123*a*/152*a*. The thickness of the wax layer 132 may be from 0.01 mm to 0.1 mm, such that the wax layer is at least partially optically transparent, similar to the optically transparent tube. The wax layer 132 may alternatively have a thickness of from 0.01 mm to 0.02 mm, from 0.02 mm to 0.04 mm, from 0.04 mm to 0.06 mm, from 0.06 mm to 0.08 mm, from 0.08 mm to 0.09 mm, from 0.09 mm to 0.1 mm, or any combination of these ranges or any smaller range therein. The first wax may be a paraffinic hydrocarbon having a carbon number in the range of 5 to 7 carbons. The first wax may be coated before or after placing the second horizontal divider 118' within the catalyst loading apparatus.

Still referring to FIGS. 4-6, the method may further include adding a first inert material 136 to the optically transparent tube 104 to form a first layer 137 including the first inert material 136. The method may then further include adding a catalyst 140 into the optically transparent tube 104 to form a second layer 141 including the catalyst 140. The method may also include adding a second inert material 144 to the optically transparent tube 104. The second inert material 144 may have a relatively lesser diameter than the first inert material 136 and the catalyst 140, i.e., the second inert material 144 may be smaller than either. Without being limited by theory, the second inert material 144 may settle into the void space between individual catalyst particles, thereby reducing void space, as would be understood in the art. Accordingly, the method may include concurrently observing the optically transparent tube 104 while the second inert material 144 is added at least until substantially no void space is observed between the catalyst 140 particles, i.e. the void space is at least a majority (>50%) occupied by second inert material, at which point the addition of the second inert material 144 may be paused.

The first inert material 136 may have a particle diameter of from 5 mesh to 40 mesh, such as from 5 mesh to 10 mesh, from 10 mesh to 20 mesh, from 20 mesh to 30 mesh, from 30 mesh to 40 mesh, or any combination of ranges or smaller range therein. The second inert material 144 may have a particle diameter of from 50 mesh to 100 mesh, such as from 50 mesh to 60 mesh, from 60 mesh to 70 mesh, from 70 mesh to 90 mesh, from 90 mesh to 100 mesh, or any combination of ranges or smaller range therein. The first inert material 136, the second inert material 144, or both may include silicon carbide, glass beads, sand, or combinations thereof.

For catalyst loading apparatus 100, the method may then include actuating the gate 121 of the first horizontal divider 118 into the opened position. As previously described, actuating the gate 121 to the opened position may operate to create an unobstructed fluid pathway within the catalyst loading apparatus 100 along the cavity 101. After the gate 121 is in the open position, the first and second layers 137/141 may be displaced into the metal tube 108 from the optically transparent tube 104. The method may then involve removing the first horizontal divider 118 from the catalyst loading apparatus 100.

As illustrated in FIGS. 4-6, as well as FIGS. 8-11, the method may also include one or more additional steps. For example, and as illustrated in FIGS. 4 and 8, the method may further include, after adding the first inert material 136, inserting the distal end of the leveling device 128 into the cavity 101 from the top surface 150*a* of the optically transparent tube 104. The method may then include contacting the disc 130 against the second layer 141. In embodiments, the plurality of bores 131 may be sized to have an aperture at least greater than the second inert material 144, but less than the catalyst 140. Accordingly, without being limited by theory, contacting the disc 130 against the second layer 141 may thereby compress the catalyst 140 of the second layer 141 while allowing the second inert material 144 to pass through the plurality of bores 131. Consequently, the insertion of the leveling device 128 may operate to hold at least a portion of the catalyst particles 140 in place and prevent their gradual shifting upwards due to the density difference between the catalyst particles 140 and the second inert material 144, forming a leveled top surface of the second layer 141.

Moreover, for catalyst loading apparatus 100', compressing of the catalyst 140 of the second layer 141 may operate to displace the first and second layers, and thereby the second horizontal divider 118', into the metal tube 108. Particularly, as previously stated, the insertion of the leveling device 128 in combination with the second horizontal divider 118' for catalyst loading apparatus 100' may operate to sandwich the first and second layers, or the first through third layers as discussed below, between the leveling device 128 and the second horizontal divider 118', minimizing disruption of the relative orientation of the layers.

The method may also include agitating or vibrating the catalyst loading apparatus contemporaneously with the addition of the catalyst 140, the addition of the second inert material 144, or both, such as with the settling device discussed supra.

Figure 10:
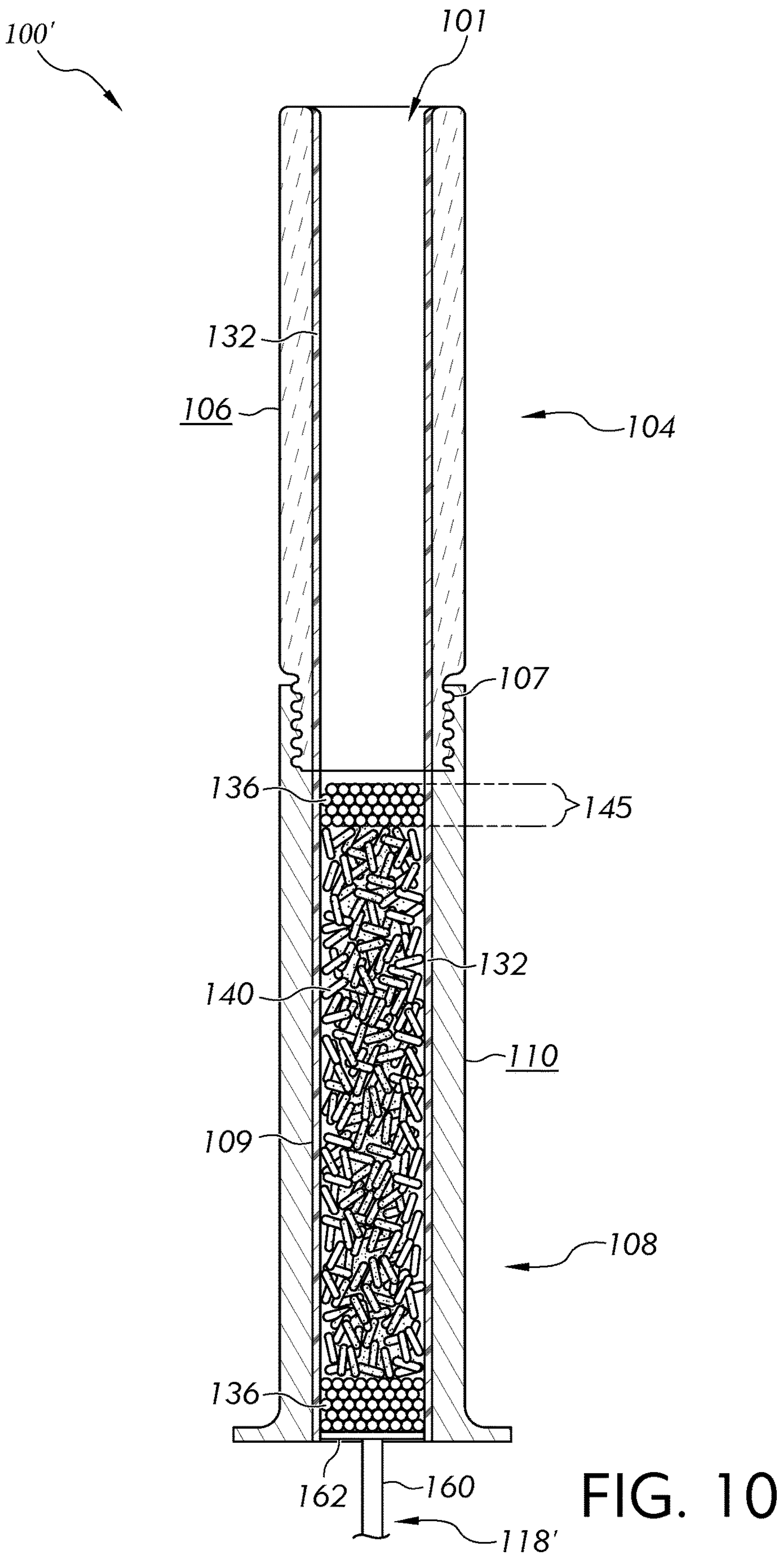
FIG. 10 depicts a cross-sectional view of the apparatus of FIGS. 7-9, and particularly the loaded catalyst after removal of the leveling device, in accordance with one or more embodiments described herein.

As shown in FIGS. 5 and 6, as well as FIG. 10, the method may also include adding additional first inert material 136 to the optically transparent tube 104 to form a third layer 145 disposed above the second layer 141 including the additional first inert material 136. The method may then including displacing the first through third layers 137/141/145 into the metal tube 108. The method may also or alternatively include adding a glass wool to the optically transparent tube 104 before the addition of the first inert material 136. The method may also or alternatively include adding a second wax to the optically transparent tube 104. The second wax may be the same as the first wax, or the second wax may be a paraffinic hydrocarbon having a carbon number in the range of 5 to 50 carbons, such as from 20 to 50 carbons. The second wax may be added at least until the second wax is visually observed to coat at least the first inert layer, at least the top surface 152*a* of the horizontal divider 118, at least the top surface 162 of the horizontal divider plate 160, or at least the glass wool.

Without being limited by theory, the addition of the second wax may help to further stabilize the layers relative positions while being displaced to the metal tube 108. The addition of the second wax may also additionally help protect the layers from exposure to external substances and preserve the catalyst 140 before use.

Now referring to FIGS. 5 and 6, as well as FIGS. 9 and 10, displacing the first and second layers 137/141, or the first through third layers 137/141/145 may include heating the exterior surface of the optically transparent tube 104, the metal tube 108, or both, thereby melting the wax layer 132, the second wax, or both, within the cavity 101. Without being limited by theory, melting of the wax, may operate to cause the layers to slide down within the cavity 101 into the metal tube 108. Alternatively or additionally, displacing of the layers may include applying a compression to at least the second layer 141 or the third layer 145. Alternatively or additionally, displacing the layers may also include applying a differential pressure across the catalyst loading apparatus 100 or 100'. In other words, the differential pressure may be applied from the top surface 150*a* of the optically transparent tube 104 to the bottom surface 151*b* of the metal tube 108, or vice versa.

Figure 11:
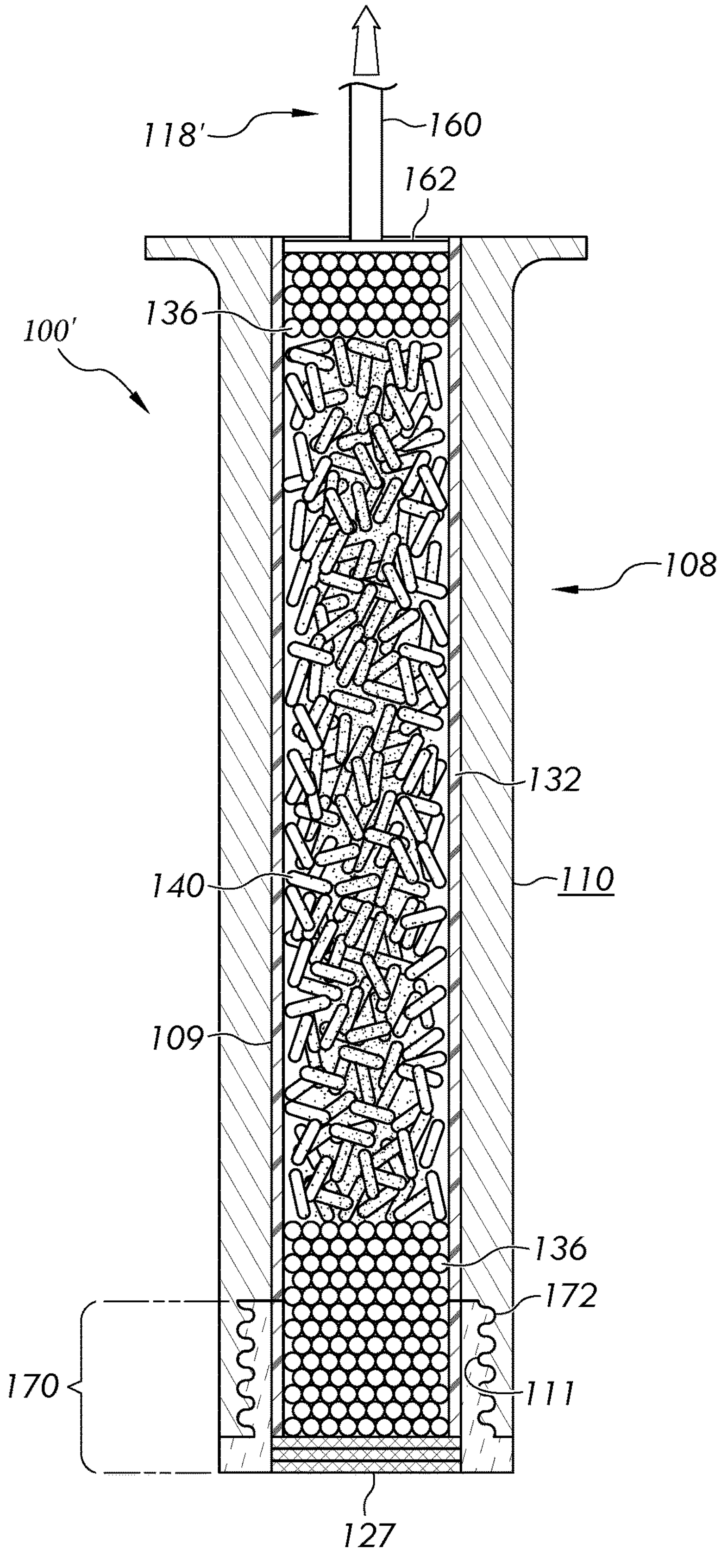
FIG. 11 depicts a cross-sectional view of the apparatus of FIGS. 7-10, and particularly the loaded catalyst after coupling of the screen and inverting of the apparatus, and prior to removal of the horizontal divider, in accordance with one or more embodiments described herein.

Referring to FIGS. 6 and 10-11, the method may also include decoupling the optically transparent tube 104 from the first horizontal divider 118 or the metal tube 106. For catalyst loading apparatus 100', the leveling device 128 may also be removed prior to, after, or concurrently with the decoupling of the optically transparent tube 104. Still referring to FIGS. 11-12, and catalyst loading apparatus 100', the method may then further include coupling a cover 170 to the top surface 151*a* of the metal tube 108, such as where the optically transparent tube 104 was coupled. The cover 170 may include a male threaded connector 172, similar or identical to the optically transparent tube's male threaded connector 107, or any of the other fasteners discussed infra, on one or both ends. The cover 170 may also include the screen 127. Accordingly, coupling the cover 170 to the metal tube may permit fluid flow out of the catalyst loading apparatus 100', but block transmission of solid material, such as that within the first through third layers, through the screen 127. Accordingly, the method may further include inverting the catalyst loading apparatus 100', resulting in the orientation depicted in FIG. 11. The method may then include removing the second horizontal divider 118' from the metal tube 108 and thus the catalyst loading apparatus 100'.

Now referring to FIGS. 4-12, as previously described, the catalyst loading apparatuses 100/100', the systems 200, and the methods may be utilized to load a catalyst for testing in a pilot plant reactor. Accordingly, a method of testing a catalyst in a pilot reactor may include loading the catalyst according to any method described supra, inserting the metal tube 108 into a pilot reactor, and testing the catalyst. Without being limited by theory, testing the catalyst may include hydrotreating, hydrocracking, hydroprocessing, steam catalytic cracking, catalytic reforming, isomerization, dearylation, alkylation, dealkylation, transalkylation, or combinations thereof.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

It is also noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

The invention claimed is:

1. A method of loading a catalyst, the method comprising:

providing a catalyst loading apparatus, the catalyst loading apparatus comprising:

an optically transparent tube having an interior surface and an exterior surface, a metal tube having an interior surface and an exterior surface, removably coupled to, and disposed below the optically transparent tube, wherein the optically transparent tube and the metal tube together define a cavity extending from a top surface of the optically transparent tube to a bottom surface of the metal tube, a horizontal divider comprising a horizontal divider shaft and a plate coupled to a distal end of the horizontal divider shaft, wherein the horizontal divider is positioned within the interior surface of the optically transparent tube, the metal tube, or at least partially within both, and the plate is configured to block the cavity, and a leveling device comprising a leveling device shaft and a disc coupled to a distal end of the leveling device shaft, the disc sized to be inserted into the cavity;

adding a first inert material to the optically transparent tube to form a first layer comprising the first inert material;

adding a catalyst to the optically transparent tube to form a second layer comprising the catalyst disposed above the first layer;

adding a second inert material to the optically transparent tube at least until substantially no void space is observed in the second layer, the second inert material having a lesser diameter than the first inert material and the catalyst;

inserting the disc of the leveling device into the cavity from the top surface of the optically transparent tube;

contacting the disc of the leveling device against the second layer comprising the catalyst; and displacing the leveling device, the first layer, the second layer, and the horizontal divider into the metal tube.

2. The method of claim 1, further comprising:

removing the leveling device from the optically transparent tube after displacing the leveling device, the first layer, the second layer, and the horizontal divider into the metal tube;

decoupling the optically transparent tube from the metal tube after displacing the leveling device, the first layer, the second layer, and the horizontal divider into the metal tube;

coupling a cover to a top surface of the metal tube, the cover comprising a screen;

inverting the catalyst loading apparatus; and removing the horizontal divider from the metal tube.

3. A method of testing a catalyst in a pilot plant reactor comprising:

loading a catalyst according to the method of claim 2;

inserting the metal tube into the pilot plant reactor; and testing the catalyst, wherein testing the catalyst comprises hydrotreating, hydrocracking, hydroprocessing, steam catalytic cracking, catalytic reforming, isomerization, dearylation, alkylation, dealkylation, transalkylation, or combinations thereof.

4. The method of claim 1, further comprising coating the interior surface of the optically transparent tube, the interior surface of the metal tube, a horizontal divider plate top surface, or combinations thereof with a first wax prior to adding the first inert material.

5. The method of claim 4, further comprising adding a second wax to the optically transparent tube at least until the second wax is observed to coat the horizontal divider plate top surface.

6. The method of claim 5, wherein:

the first wax comprises a paraffinic hydrocarbon having a carbon number in the range of from 5 to 7 carbons;

the second wax comprises a paraffinic hydrocarbon having a carbon number in the range of from 5 to 50 carbons; or both.

7. The method of claim 4, wherein displacing the leveling device, the first layer, the second layer, and the horizontal divider into the metal tube comprises:

heating the exterior surface of the optically transparent tube, the metal tube, or both, thereby melting the wax layer within the cavity;

applying a compression to at least the second layer through the leveling device; or both.

8. The method of claim 1, wherein the disc of the leveling device further comprises a plurality of bores through the disc, the plurality of bores having an aperture at least greater than the second inert material, but less than the catalyst.

9. The method of claim 1, further comprising:

adding additional first inert material to the optically transparent tube prior to inserting the leveling device to form a third layer comprising the first inert material disposed above the second layer;

contacting the disc of the leveling device against the third layer instead of the second layer; and displacing the leveling device, the first layer, the second layer, the third layer, and the horizontal divider into the metal tube.

10. The method of claim 1, further comprising agitating or vibrating the catalyst loading apparatus contemporaneously with the addition of the catalyst, the addition of the second inert material, or both.

11. The method of claim 1, wherein:

the interior diameter of the optically transparent tube and the metal tube are from 1 centimeter to 15 centimeters; and the length of the optically transparent tube, the metal tube, or both is from 0.1 meters to 10 meters.

12. A method of loading a catalyst, the method comprising:

providing a catalyst loading apparatus, the catalyst loading apparatus comprising:

an optically transparent tube having an interior surface and an exterior surface, a metal tube having an interior surface and an exterior surface, removably coupled to, and disposed below the optically transparent tube, wherein the optically transparent tube and the metal tube together define a cavity extending from a top surface of the optically transparent tube to a bottom surface of the metal tube, a horizontal divider comprising a horizontal divider shaft and a plate coupled to a distal end of the horizontal divider shaft, wherein the horizontal divider is positioned within the interior surface of the optically transparent tube, the metal tube, or at least partially within both, and the plate is configured to block the cavity, and a leveling device comprising a leveling device shaft and a disc coupled to a distal end of the leveling device shaft, the disc sized to be inserted into the cavity;

coating the interior surface of the optically transparent tube, the interior surface of the metal tube, a horizontal divider plate top surface, or combinations thereof with a first wax;

adding a first inert material to the optically transparent tube to form a first layer comprising the first inert material;

adding a catalyst to the optically transparent tube to form a second layer comprising the catalyst disposed above the first layer;

adding a second inert material to the optically transparent tube at least until substantially no void space is observed in the second layer, the second inert material having a lesser diameter than the first inert material and the catalyst;

adding additional first inert material to the optically transparent tube prior to inserting the leveling device to form a third layer comprising the first inert material disposed above the second layer; and adding a second wax to the optically transparent tube at least until the second wax is observed to coat the horizontal divider plate top surface;

inserting the disc of the leveling device into the cavity from the top surface of the optically transparent tube;

contacting the disc of the leveling device against the third layer;

displacing the leveling device, the first layer, the second layer, the third layer, and the horizontal divider into the metal tube;

removing the leveling device from the optically transparent tube;

decoupling the optically transparent tube from the metal tube;

coupling a cover to a top surface of the metal tube, the cover comprising a screen;

inverting the catalyst loading apparatus; and removing the horizontal divider from the metal tube.

* * * * *